US009260080B2

(12) United States Patent  
Maguire et al.

(10) Patent No.: US 9,260,080 B2  
(45) Date of Patent: Feb. 16, 2016

(54) ELECTRIC VEHICLE SERVICE DISCONNECT LOCK

(71) Applicant: FORD GLOBAL TECHNOLOGIES, LLC, Dearborn, MI (US)

(72) Inventors: Patrick Daniel Maguire, Ann Arbor, MI (US); Kristen S Tamm, Bloomfield, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 65 days.

(21) Appl. No.: 14/252,105

(22) Filed: Apr. 14, 2014

(65) Prior Publication Data

US 2015/0291130 A1 Oct. 15, 2015

(51) Int. Cl.  
*H01R 13/44* (2006.01)  
*B60R 25/40* (2013.01)  
*B60L 11/18* (2006.01)

(52) U.S. Cl.  
CPC ............. *B60R 25/40* (2013.01); *B60L 11/1818* (2013.01)

(58) Field of Classification Search  
CPC ................... H01R 12/6395; H01R 13/6397  
USPC ................. 439/304, 347, 953, 133; 307/10.7; 337/205  
See application file for complete search history.

(56) References Cited

U.S. PATENT DOCUMENTS

| | | | | |
|---|---|---|---|---|
| 941,165 | A * | 11/1909 | Murray | 337/196 |
| 2,660,715 | A * | 11/1953 | Glass | B60K 28/04 180/273 |
| 3,755,772 | A * | 8/1973 | Reed | H01R 13/707 439/304 |
| 3,824,472 | A * | 7/1974 | Engel et al. | 455/343.1 |
| 4,063,110 | A * | 12/1977 | Glick | 307/112 |
| 4,740,168 | A * | 4/1988 | Carney et al. | 439/133 |
| 4,945,872 | A * | 8/1990 | Embry | B60R 25/045 123/146.5 B |
| 5,174,781 | A * | 12/1992 | Muzslay | 439/372 |
| 5,240,428 | A * | 8/1993 | Nakata | F02P 1/086 439/130 |
| 5,301,494 | A * | 4/1994 | Peot | H01R 13/447 320/107 |
| 5,373,910 | A * | 12/1994 | Nixon | 180/65.1 |
| 5,476,392 | A * | 12/1995 | Inaba | B60L 3/00 439/341 |
| 5,820,413 | A * | 10/1998 | Yamada et al. | 439/620.26 |
| 5,831,228 | A * | 11/1998 | Kuki et al. | 200/16 E |
| 5,859,580 | A * | 1/1999 | Hashizawa | H01R 13/68 337/255 |
| 5,906,514 | A * | 5/1999 | Nelson, Jr. | 439/620.27 |
| 5,934,918 | A * | 8/1999 | Wuechner | 439/133 |
| 5,944,550 | A * | 8/1999 | Vindigni | H01R 13/6397 439/133 |
| 6,087,737 | A * | 7/2000 | Alksnat et al. | 307/10.7 |
| 6,317,312 | B1 * | 11/2001 | Hashizawa et al. | 361/642 |
| 6,337,448 | B1 * | 1/2002 | Konda | 200/238 |
| 6,658,204 | B2 * | 12/2003 | Schurter et al. | 392/441 |
| 6,746,275 | B2 * | 6/2004 | Yamakawa et al. | 439/507 |
| 6,768,643 | B1 * | 7/2004 | Rust et al. | 361/732 |
| 6,780,066 | B2 * | 8/2004 | Hasegawa et al. | 439/732 |
| 6,878,005 | B2 * | 4/2005 | Varone | H01R 13/6397 439/304 |
| 7,125,268 | B1 * | 10/2006 | Marukawa et al. | 439/133 |
| 7,244,148 | B2 * | 7/2007 | Maguire et al. | 439/620.28 |
| 7,402,068 | B1 * | 7/2008 | Tarchinski | 439/350 |
| 7,427,447 | B2 * | 9/2008 | Nishiumi | 429/411 |
| 7,559,778 | B2 | 7/2009 | Pittenger et al. | |

(Continued)

FOREIGN PATENT DOCUMENTS

WO 2013182601 12/2013

*Primary Examiner* — Neil Abrams  
(74) *Attorney, Agent, or Firm* — Carlson, Gaskey & Olds, P.C.

(57) ABSTRACT

A service disconnect including a lock actuatable between a first state that prevents a removal of a service disconnect from a closed position and a second state that permits the removal.

20 Claims, 12 Drawing Sheets

(56) References Cited

U.S. PATENT DOCUMENTS

| | | | |
|---|---|---|---|
| 7,750,789 B2* | 7/2010 | Titokis et al. | 337/194 |
| 7,887,942 B2* | 2/2011 | Rejman et al. | 429/97 |
| 7,893,809 B2* | 2/2011 | Head | 337/194 |
| 8,098,126 B2* | 1/2012 | Niedzwiecki et al. | 337/205 |
| 8,460,027 B2* | 6/2013 | Topolewski | 439/511 |
| 8,466,586 B2* | 6/2013 | Tarchinski et al. | 307/328 |
| 8,550,833 B2 | 10/2013 | Martin | |
| 8,562,368 B2* | 10/2013 | Boyer | 439/345 |
| 8,574,004 B1* | 11/2013 | Tarchinski et al. | 439/507 |
| 8,854,797 B2* | 10/2014 | Ikeda et al. | 361/643 |
| 8,893,838 B2* | 11/2014 | Ichikawa | 180/68.5 |
| 8,951,060 B2* | 2/2015 | Meyer-Ebeling | 439/347 |
| 9,004,935 B2* | 4/2015 | Lim | B60L 3/04 |
| | | | 439/347 |
| 9,059,533 B2* | 6/2015 | Bogart | H01H 9/00 |
| 2005/0094786 A1* | 5/2005 | Ossa | 379/111 |
| 2011/0079494 A1* | 4/2011 | Joswig et al. | 200/50.01 |
| 2013/0043971 A1 | 2/2013 | Chen et al. | |
| 2014/0187071 A1* | 7/2014 | Rule-Greet et al. | 439/304 |
| 2015/0099379 A1* | 4/2015 | Borden et al. | 439/133 |
| 2015/0207130 A1* | 7/2015 | Maguire et al. | 439/11 |

* cited by examiner

ELECTRIC VEHICLE SERVICE DISCONNECT LOCK

BACKGROUND

This disclosure relates generally to a service disconnect and, more particularly, to a lock for a service disconnect to prevent an unauthorized install or removal.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), fuel cell vehicles, and battery electric vehicles (BEVs). A powertrain of an electric vehicle is typically equipped with a battery that stores electrical energy for powering the electric machine. The battery may be charged prior to use. The battery may be recharged during a drive by regeneration braking or an internal combustion engine.

Electric vehicles can include a service disconnect. During normal operation, the service disconnect is in a closed position. Opening the service disconnect may be required when, for example, performing maintenance on the electric vehicle. Opening the service disconnect can prevent operation of the electric vehicle.

SUMMARY

A service disconnect device according to an exemplary aspect of the present disclosure includes, among other things, a lock actuatable between a first state that prevents removal of a service disconnect from a closed position and a second state that permits the removal.

In another example of the foregoing device, the lock in the second state prevents movement of the service disconnect from an open position to the closed position.

In another example of any of the foregoing devices, the lock is secured to a base of the service disconnect.

In another example of any of the foregoing devices, the lock is secured to a plug of the service disconnect.

In another example of any of the foregoing devices, the lock is rotatably attached to a base or a plug of the service disconnect.

In another example of any of the foregoing devices, the lock comprises a solenoid.

In another example of any of the foregoing devices, the lock comprises a key cylinder selectively engageable with a key.

In another example of any of the foregoing devices, the lock further comprises a pin received within an aperture when the lock is in the first state and the pin is withdrawn from the aperture when the lock is in the second state.

In another example of any of the foregoing devices, the pin extends along an axis, and the pin translates along the axis to move between the first state and the second state.

In another example of any of the foregoing devices, the pin includes an end face that is tapered to contact a portion of the service disconnect during initial assembly.

In another example of any of the foregoing devices, the pin rotates around the axis after initial assembly to change an orientation of the end face.

In another example of any of the foregoing devices, the pin rotates about an axis to move between the first state and the second state.

In another example of any of the foregoing devices, the pin includes an end face that is tapered to contact a portion of the service disconnect during initial assembly.

A device of an electric vehicle according to an exemplary aspect of the present disclosure includes, among other things, a base, a plug that engages the base to selectively complete an electrical circuit between a battery and the electric vehicle, and a lock to selectively block movement of the plug from an engaged position with the base.

In another example of the foregoing device, the lock further selectively blocks movement of the plug to an engaged position from a disengaged position.

In another example of any of the foregoing devices, the lock is secured to the base.

In another example of any of the foregoing devices, the lock is accessible from a position outside a cabin of the electric vehicle.

A method according to an exemplary aspect of the present disclosure includes, among other things, locking a service disconnect in an engaged position to prevent unauthorized disengagement.

In another example of the foregoing method, the exterior service disconnect is located outside an interior of a vehicle.

In another example of any of the foregoing methods, the method closes a circuit between a battery and an electric vehicle when the service disconnect is in the engaged position and opens a circuit between the battery to the electric vehicle when the service disconnect is in the disengaged position.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
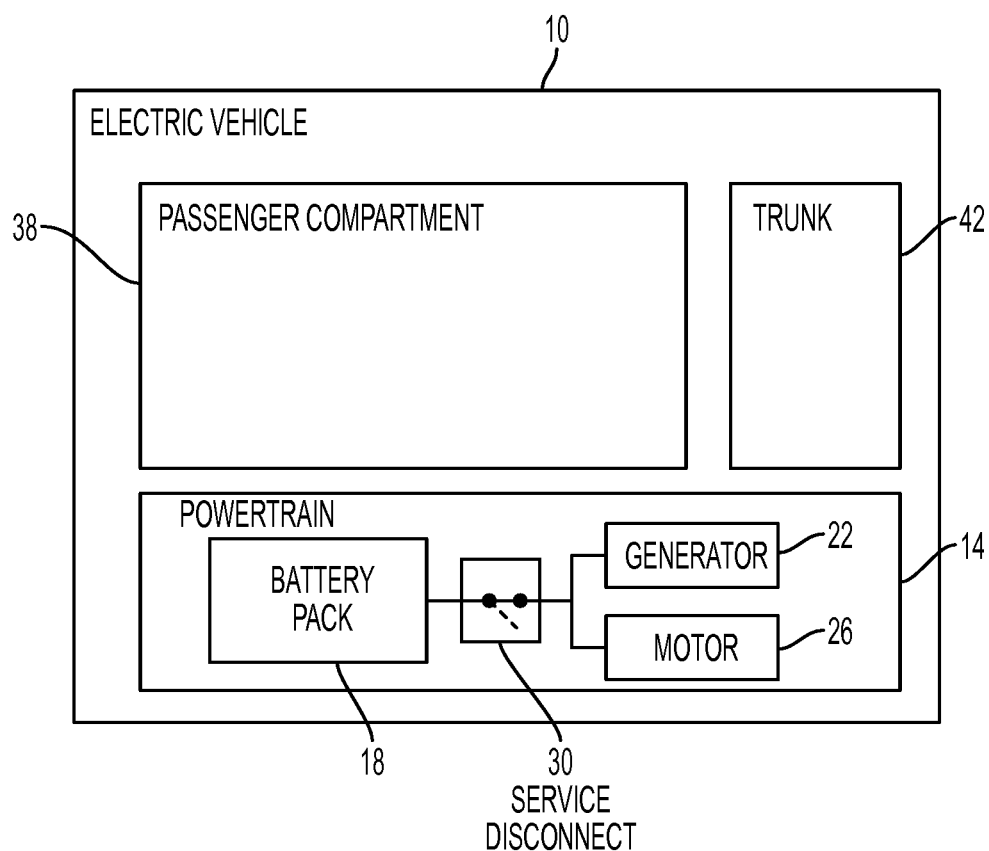
FIG. 1 illustrates a highly schematic view of an example electric vehicle.
Figure 2:
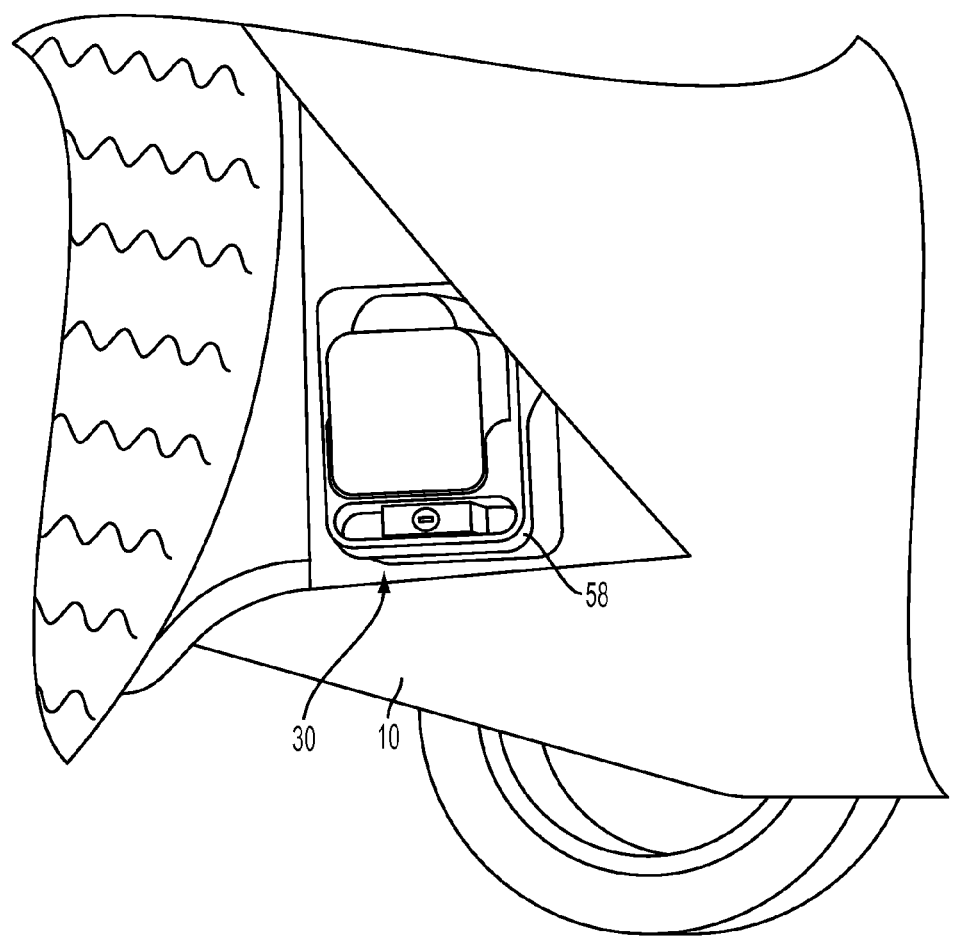
FIG. 2 illustrates a perspective view of an example service disconnect attached to the vehicle of FIG. 1.
Figure 3:
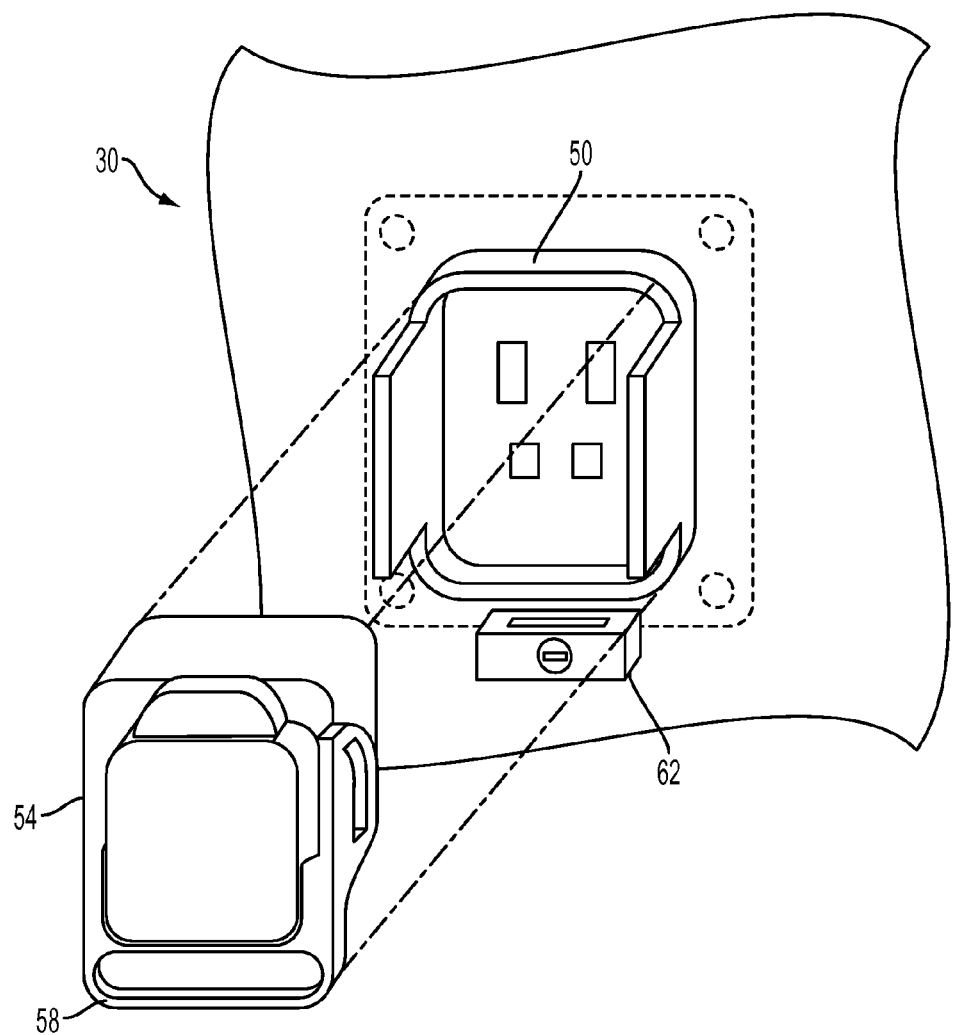
FIG. 3 shows an exploded view of the example service disconnect of FIGS. 1 and 2.

Referring to FIGS. 1 to 3, an example electric vehicle 10 includes a powertrain 14 having at least a battery pack 18, a generator 22, and a motor 26. Other example powertrains may include a generator or a motor.

The example electric vehicle 10 is a hybrid electric vehicle (HEV), however, it should be understood that the concepts described herein are not limited to HEVs and could extend to other electrified vehicles, including, but not limited to, plug-in hybrid electric vehicles (PHEVs) and battery electric vehicles (BEVs).

In an example embodiment, the powertrain 14 is a power split powertrain system that employs a first drive system and a second drive system. The first drive system includes a combination of an engine and the generator 22. The second drive system includes at least the motor 26, the generator 22, and the battery pack 18. In this example, the second drive system is considered an electric drive system of the powertrain 14. The first and second drive systems generate torque to drive one or more sets of vehicle drive wheels.

The battery pack 18 is an example type of electric vehicle battery pack. The battery pack 18 can have the form of a high-voltage battery that is capable of outputting electrical power to operate the motor 26 and the generator 22. Other types of energy storage devices, output devices, or both can be used with the electric vehicle having the powertrain 14.

A service disconnect 30 selectively disconnects the battery pack 18 from other portions of the powertrain 14. Opening the service disconnect 30 opens a circuit between the battery pack 18 and other portions of the powertrain 14. Opening the circuit prevents current flow from the battery. Closing the service disconnect 30 closes this circuit. The service disconnect 30 may thus provide a localized fuse associated with the battery pack 18.

The service disconnect 30 may be opened when, for example, a technician is performing a maintenance procedure on the electric vehicle 10. The service disconnect 30, when open, electrically disconnects the battery pack 18 from remaining portions of the powertrain 14, which isolates the operator from relatively high-voltage of the battery pack 18.

The service disconnect 30 may be located in various positions within the electric vehicle 10. In some prior art examples, a service disconnect is an interior service disconnect that is located, accessible, or both from within a passenger compartment 38 or a trunk 42 of the electric vehicle 10. The passenger compartment 38 and the trunk 42 are lockable areas of vehicles. Door locks and trunk locks prevent unauthorized access to the passenger compartment 38 and the trunk 42.

Depending on placement of the battery pack 18, options for placement of the service disconnect 30 within the electric vehicle 10 can be limited. Adding access panels introduces added complexity to the manufacturing process and additional required parts on the vehicle. Thus, the service disconnect 30 is an exterior service disconnect and is located outside both the passenger compartment 38 and the trunk 42.

The example service disconnect 30 is mounted to a right side of the electric vehicle 10 near a rear wheel. In this position, the service disconnect 30 is outside both the passenger compartment 38 and the trunk 42. As can be appreciated, locking doors of the passenger compartment 38 and a lid of the trunk 42 would not limit access to the service disconnect 30.

The example service disconnect 30 includes a base 50, a plug 54, and a handle 58. The service disconnect is closed when the plug is fully seated within the base 50. In this position, the service disconnect 30 is closed and contactors of the battery pack 18 are electrically coupled to the battery cells.

The handle 58 is pivotably attached to the plug 54. Pivoting the handle 58 may be required to fully seat the plug 54 within the base 50. Pivoting the handle 58 seats the plug 54 within the base 50.

The example service disconnect 30 includes a lock 62 to prevent the plug 54 from withdrawing from the base 50. The lock 62 thus prevents the service disconnect 30 from moving from a closed position to an open position.

Figure 4:
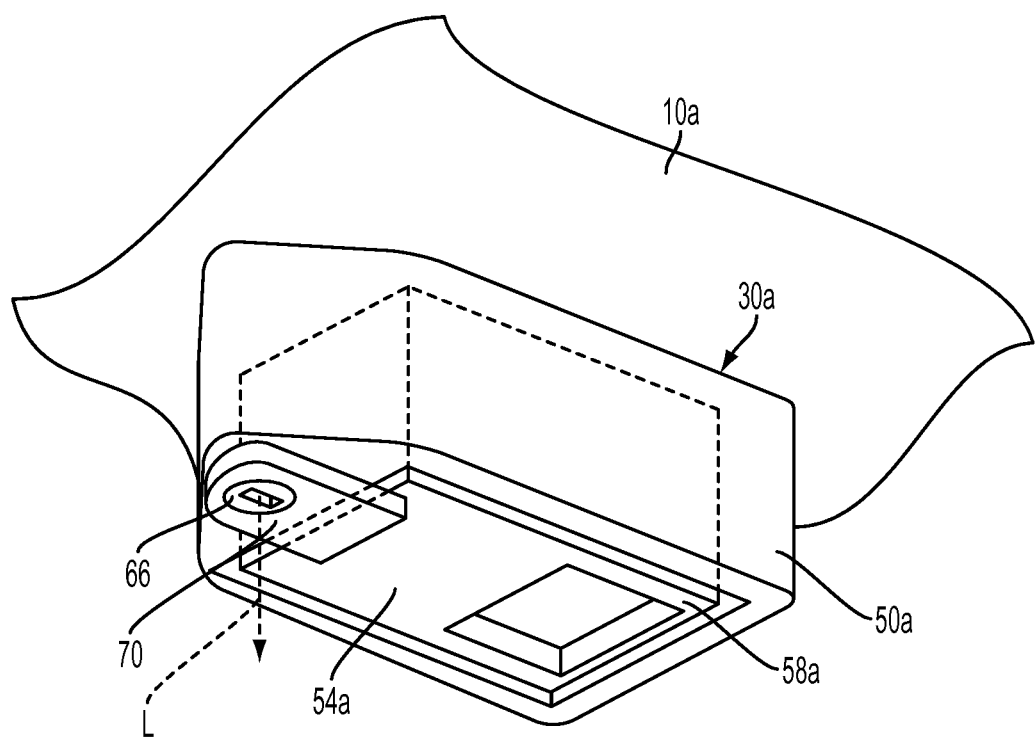
FIG. 4 illustrates another example service disconnect locked in a closed position.
Figure 5:
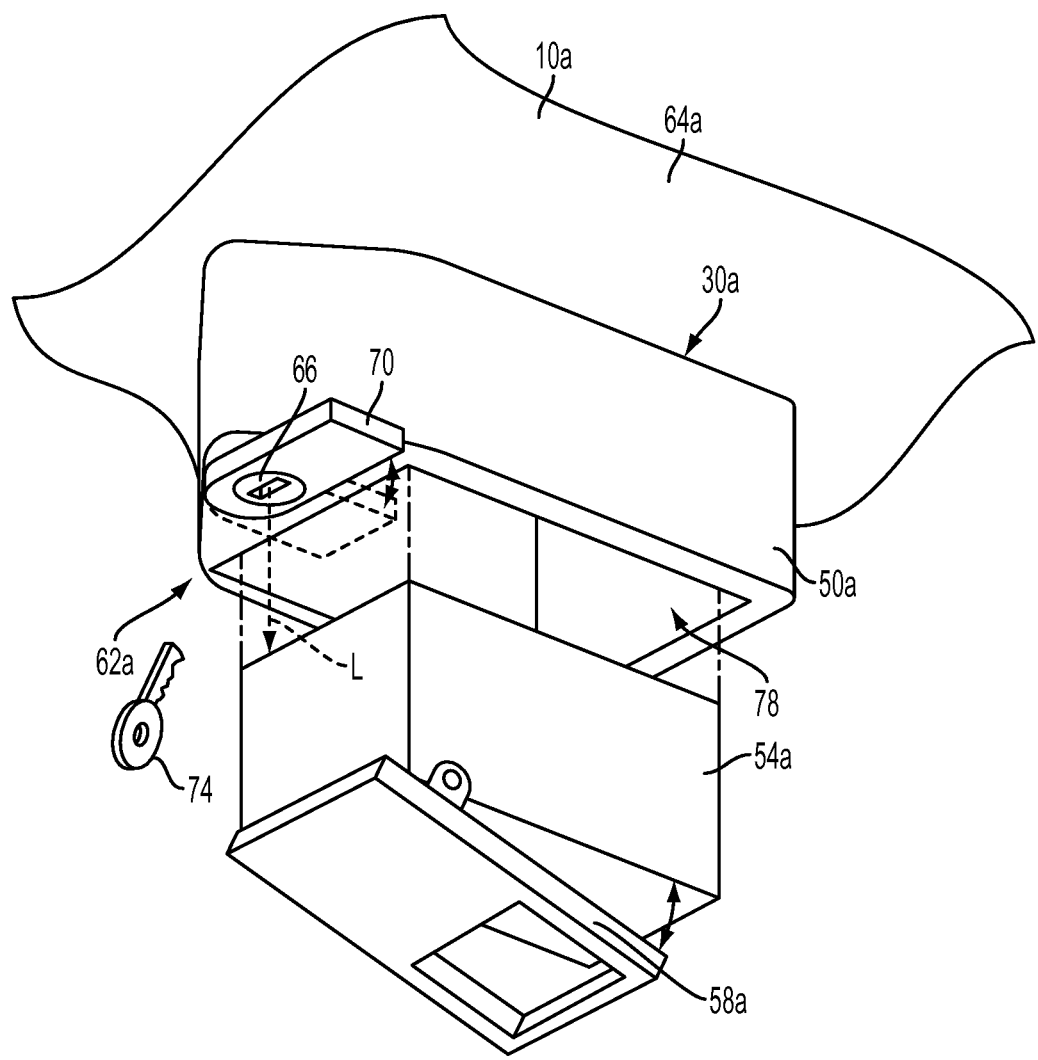
FIG. 5 illustrates the service disconnect of FIG. 4 in an open position.

Referring to FIGS. 4 and 5, in another example service disconnect 30a, a lock 62a prevents removal of a plug 54a from a base 50a. In this example, the base 50a is attached directly to a battery enclosure 10a. The plug 54a is inserted and withdrawn from the base 50a from outside of both a passenger compartment, and a trunk. Without the lock 62a, the service disconnect 30a would have no mechanism for preventing unauthorized movement of the plug 54a to and from closed positions and open positions with the base 50a.

The example lock 62a includes a key cylinder 66. Insertion of an appropriate key 74 within the key cylinder 66 permits an arm 70 to transition from a first state (shown in FIG. 4) to a second state (shown in FIG. 5). The arm 70 transitions between the first and second states by rotating about a lock cylinder axis L.

The example arm 70 is not transitionable between the first and second state without the key 74. Thus, only a user having the key 74 would be able to transition the arm 70. Only authorized users are given the key 74 to prevent unauthorized users from being able to transition the arm 70.

To move service disconnect to an open position, the plug 54 is withdrawn from the base 50b. The arm 70 is transitioned to the second state shown in FIG. 5 to permit withdrawal of the plug 54 from the base.

The plug 54a is then free to be withdrawn from an open area 78 of the base 50a to open the service disconnect 30a. A handle 58a of the plug 54a may need to rotate relative to the remaining portions of the plug 54a to permit removal of the service disconnect 30a.

When the plug 54a is seated within the base 50a, an authorized user, using the key 74, is able to transition the arm 70 to the first state shown in FIG. 4 to the second state shown in FIG. 5. In the first state, the arm 70 overlaps a portion of the plug 54a and prevents movement of the plug 54a from the closed position.

If the service disconnect 30a needs to be opened, the key 74 must be engaged and rotated within the lock cylinder 66. Access to the key 74 can be limited to prevent unauthorized individuals from opening the service disconnect 30a.

The service disconnect 30a may be opened when performing maintenance on portions of the powertrain 14. In some examples, the arm 70 is moved to the first state using the key 74 when the plug 54a is withdrawn from the base 50a and the service disconnect 30a is open. This positioning for the arm 70 is shown in the phantom lines of the arm 70 in FIG. 5. The arm 70 in the first state when the plug 54 is open provides a lockout protection for a technician servicing the powertrain 14, for example. If the arm 70 is in the first state when the plug 54 is open, the arm 70 blocks insertion of the plug 54a into the base 50a. Blocking movement in this way prevents the service disconnect 30a from closing.

After the technician services the powertrain 14, the key 74 is used to transition the arm 70 to a state that permits installation and closure of the service disconnect 30a.

Figure 6:
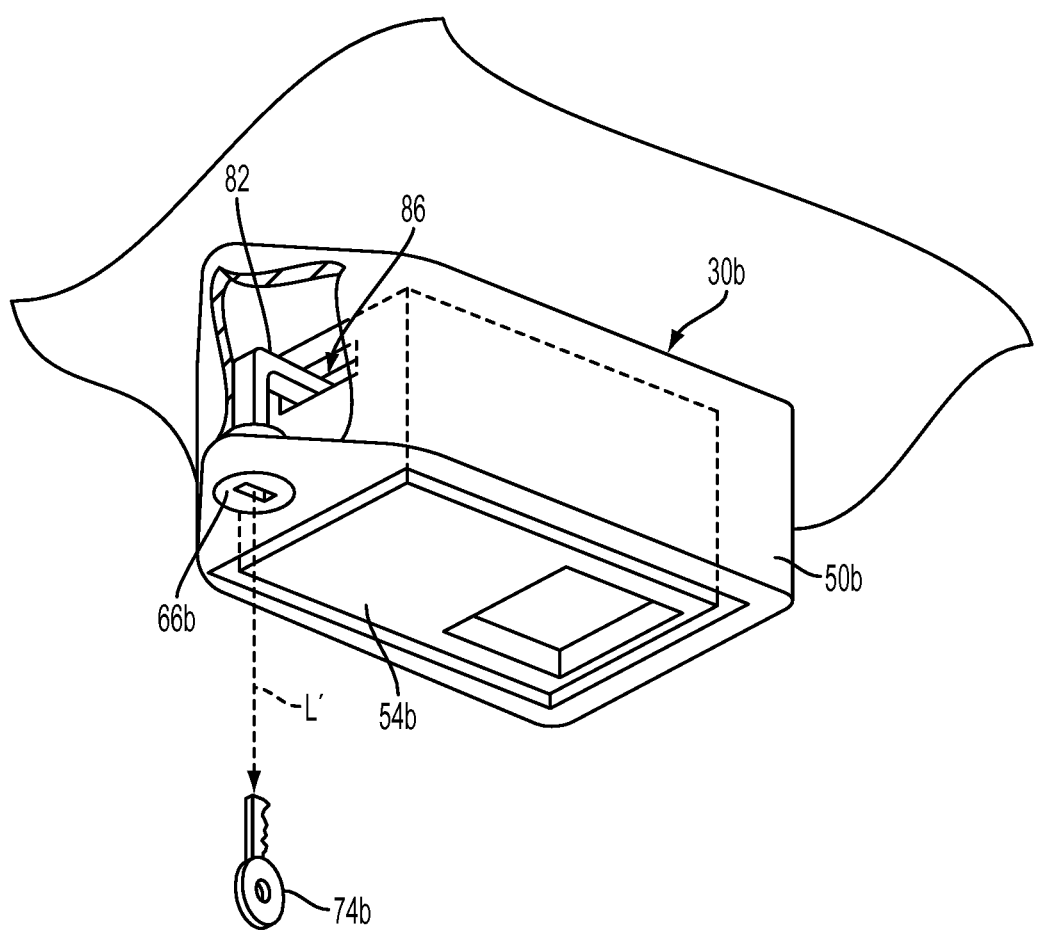
FIG. 6 illustrates yet another example service disconnect locked in a closed position.
Figure 7:
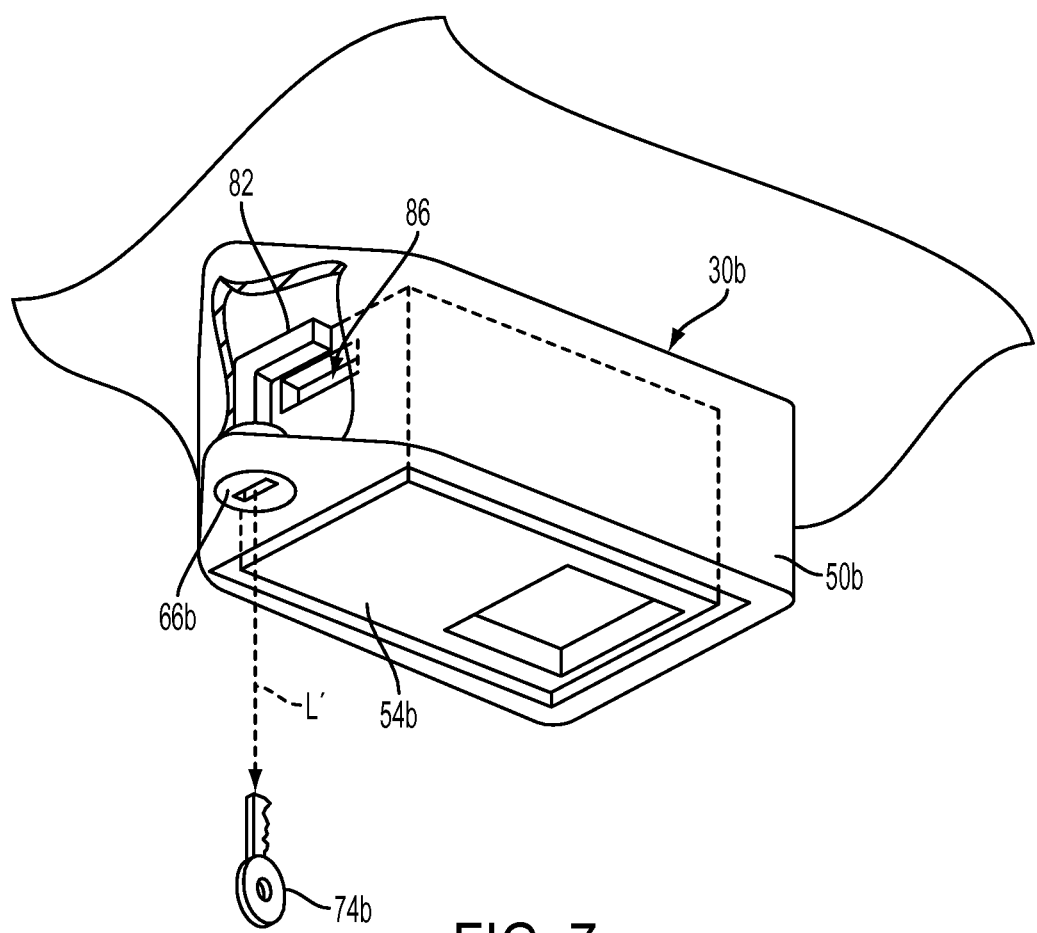
FIG. 7 illustrates the service disconnect of FIG. 6 in an open position.

Referring now to FIGS. 6 and 7, another example service disconnect 30b includes a lock cylinder 66b that can be rotated about a lock cylinder axis L' by an authorized individual possessing a key 74b. The lock cylinder 66b cannot be rotated without using the key 74b in this example.

Rotation of the example lock cylinder 66b causes and angled pin or an angled rod 82 to move between a first state shown in FIG. 6 and a second state shown in FIG. 7. In the first state, the rod 82 is received within a corresponding groove 86 provided within a portion of the plug 54b. Receipt of an end of the rod 82 within the groove 86 prevents movement of the plug 54b from the base 50b and opening of the service disconnect 30b. The rod 82 in the first state thus prevents the service disconnect 30b from opening. In the second state, the plug 54b is free to withdraw from the base 50b and open the service disconnect 30b.

When the plug 54b is withdrawn, the rod 82 can be rotated to the position of FIG. 6 to block installation of the base 50b. If installation of the service disconnect 30b is attempted when the rod 82 is in the position of FIG. 6, the rod 82 contacts the service disconnect 30b to prevent the service disconnect 30b from fully seating within the base 50b and closing.

Figure 8:
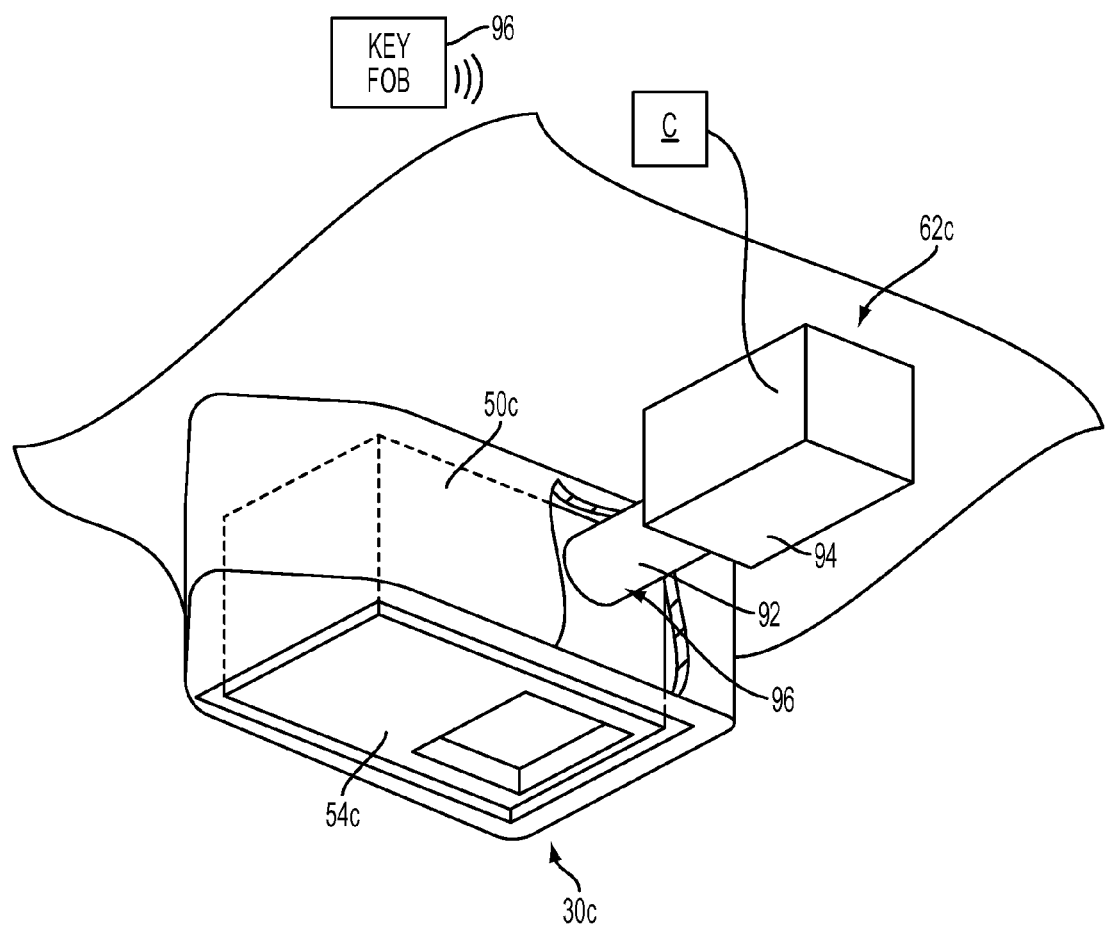
FIG. 8 illustrates still another example service disconnect locked in a closed position.
Figure 9:
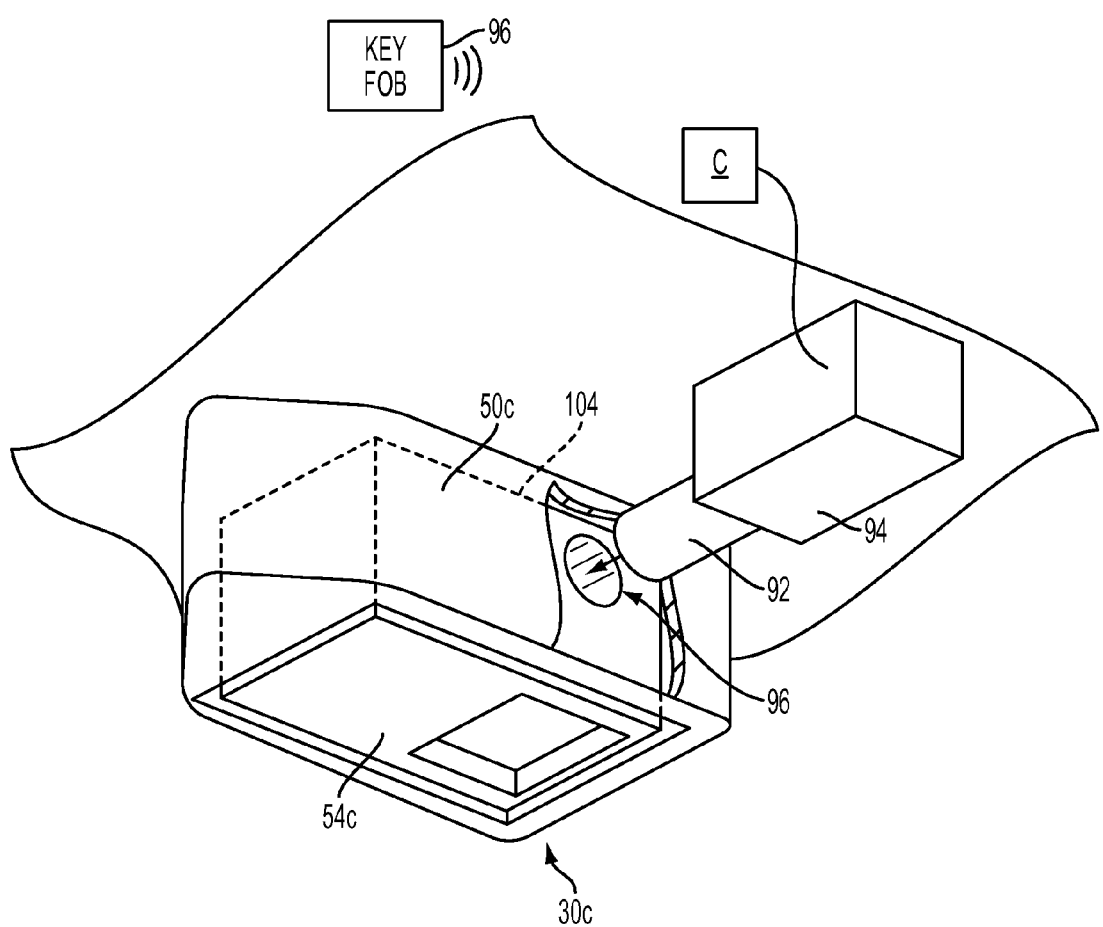
FIG. 9 illustrates the service disconnect of FIG. 8 in an open position.

Referring now to FIGS. 8 and 9, yet another example service disconnect 30c utilizes a lock 62c in the form of a pin 92 extended and retracted by a solenoid 94. When the pin 92 is extended, the pin 92 is received within an aperture 96 provided in a plug 54c. Receipt of the pin 92 within the aperture 96 limits movement of the plug 54c from a closed position within a base 50c. When the pin 92 is retracted to the position of FIG. 9, the plug 54c is free to move relative to the base 50c.

A controller C is coupled to the solenoid 94. The controller C selectively actuated the solenoid 94 to extend and retract the pin 92. A keyfob 98 includes buttons that are pressed to send a wireless signal to the controller C. Signals from the keyfob 98 instructs the controller C to actuate the solenoid 94. The keyfob 98 is thus used to transition the lock 62c between the first state and the second state. Access to the keyfob 98 may be limited to prevent unauthorized individuals from moving the pin 92 to open the service disconnect 30c.

Figure 10:
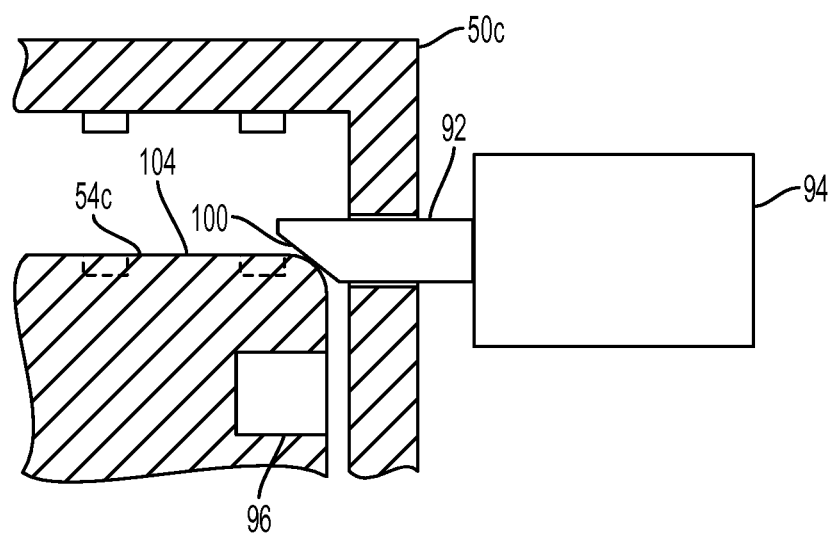
FIG. 10 illustrates a fragmented view of a portion of the service disconnect of FIGS. 8 and 9 in an open position and moveable to a closed position.
Figure 11:
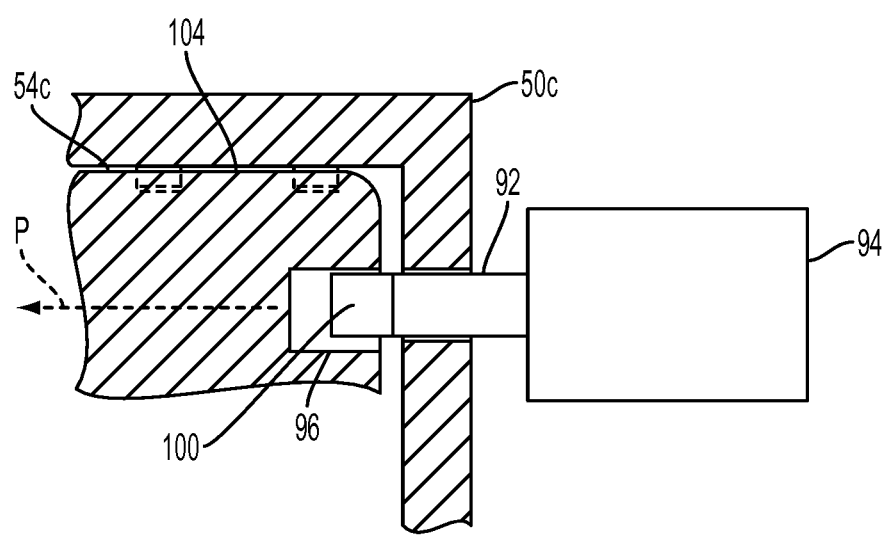
FIG. 11 illustrates a fragmented view of the portion of the service disconnect of FIGS. 8 and 9 locked in a closed position.
Figure 12:
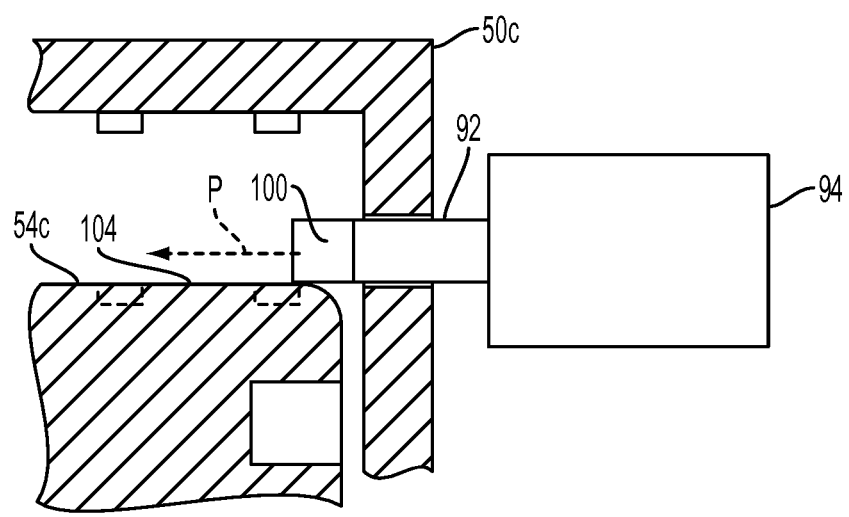
FIG. 12 illustrates a fragmented view of a portion of the service disconnect of FIGS. 8 and 9 locked in an open position.

Referring FIGS. 10 to 12 with continuing reference to FIGS. 8 and 9, the example pin 92 terminates at a tapered surface 100. During initial assembly and seated of service disconnect 30c, at an assembly plant for example, the tapered surface 100 of the pin 92 faces outwardly toward the a bottom surface 104 of the plug 54c. As the plug 54c is inserted into the base 50c, the bottom edge 104 of the plug 54c contacts the tapered surface 100 pushing the pin 92 and causing it to retract toward the solenoid 94 as shown in FIG. 10.

When the plug 54c is fully inserted and the service disconnect 30c closed, the pin 92 extends into the aperture 96. The pin 92 within the aperture 96 prevents the plug 54c from withdrawing from the closed position.

To withdraw the plug 54c and open the service disconnect 30c, the solenoid 94 is actuated to retract the pin 92.

In this example, the initial activation of the solenoid 94 causes the pin 92 to spin about a pin axis P such that the tapered surface 100 faces roughly 90 degrees from the initial rotational orientation. In this position, the tapered surface 100 faces a wall of the base 50c rather than being presented outwardly. In this position, the plug 54c cannot be inserted nor removed without actuating the solenoid 94 to withdraw the pin 92.

When the tapered surface 100 faces 90 degrees from the bottom edge 104, the pin 92 also prevents movement of the plug 54c to the closed position within the base 50c as shown in FIG. 12. The pin 92 oriented to have the tapered surface 100 facing away from the bottom edge 104 thus provides the lock-out functionality for a maintenance worker that prevents closing of the service disconnect 30c during a maintenance procedure.

Because the tapered surface 100 is initially presented outwardly, the pin 92 does not interfere with seating the service disconnect 30c during initial assembly. After the initial assembly, the pin is rotated 90 degrees once such that the chamfer does not enable insertion of the plug without actuation of the solenoid 94 in any subsequent insertion operation. In this example, activating the solenoid 94 is not required during initial assembly, but activating the solenoid 94 is required to insert or remove the plug 54c after initial assembly.

A person having skill in this art and the venefit of this disclosure would understand how to spin the pin 92 ninety degrees in response to activating the solenoid 94. In some examples, indexing mechanisms of the type found in click style ball-point pens can be used.

In this example, the tapered surface 100 is described in connection with the pin 92, which extends along and moves along the pin axis P between the first state and the second state. In other examples, the tapered surface 100 is incorporated into a pin that extends along a pin axis but does not move between the first state and the second state along the pin axis. The tapered surface could be used in connection with pins, such as the rod 82 of the example of FIGS. 6 and 7.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A service disconnect device, comprising:
 a lock actuatable between a first state that prevents movement of a service disconnect from a closed to an open position and from the open to the closed position, and a second state that permits the movement, the lock directly attached to a base or a plug of the service disconnect in the first and second states, the lock permitting authorized users from transitioning the lock between the first and second states, the lock preventing unauthorized users from transitioning the lock between the first and second states.

2. The device of claim 1, wherein the lock is secured to the base of the service disconnect.

3. The device of claim 1, wherein the lock is secured to the plug of the service disconnect.

4. The device of claim 1, wherein the lock comprises a solenoid.

5. The device of claim 1, wherein the lock comprises a key cylinder selectively engageable with a key.

6. The device of claim 1, wherein the lock further comprises a pin received within an aperture when the lock is in the first state and the pin is withdrawn from the aperture when the lock is in the second state.

7. The device of claim 6, wherein the pin extends along an axis, and the pin translates along the axis to move between the first state and the second state.

8. The device of claim 7, wherein the pin includes an end face that is tapered to contact a portion of the service disconnect during initial assembly.

9. The device of claim 8, wherein the pin rotates around the axis after initial assembly to change an orientation of the end face.

10. A service disconnect device, comprising:
 a lock actuatable between a first state that prevents removal of a service disconnect from a closed position and a second state that permits the removal, the lock comprising a pin that rotates about an axis when the lock actuates between the first state where the pin is received within an aperture and the second state where the pin is withdrawn from the aperture.

11. The device of claim 10, wherein the pin includes an end face that is tapered to contact a portion of the service disconnect during initial assembly.

12. A device of an electric vehicle, comprising:
a base of a service disconnect;
a plug of the service disconnect that engages the base to selectively complete an electrical circuit between a battery and the electric vehicle; and
a lock directly attached to the base or the plug, the lock to block movement of the plug to and from an engaged position with the base when in a first state, the lock to permit movement of the plug to and from the engaged position when in a second state, the lock permitting authorized users from transitioning the lock between the first and second states, the lock preventing unauthorized users from transitioning the lock between the first and second states.

13. The device of claim 12, wherein the lock is secured to the base.

14. A method, comprising:
locking a lock to prevent unauthorized disengagement of a service disconnect from an engaged position where a plug is coupled to a base on a vehicle; and
locking the lock to prevent unauthorized engagement of the service disconnect from a disengaged position where the plug is decoupled from the base, wherein the lock is directly attached to a base or a plug of the service disconnect before and after the locking.

15. The method of claim 14, wherein the service disconnect is located outside an interior of the vehicle.

16. The method of claim 14, further comprising closing a circuit between a battery and an electric vehicle when the service disconnect is in the engaged position and opening the circuit between the battery and the electric vehicle when the service disconnect is in the disengaged position.

17. The device of claim 1, wherein the base and the plug are coupled to each other when the service disconnect is in the closed position, and the base and the plug are completely decoupled from each other when the service disconnect is in the open position.

18. The device of claim 12, wherein the base and the plug are attached to each other when in the engaged position, and the base and the plug are completely detached from each other when the service disconnect is in a disengaged position.

19. The device of claim 12, wherein the lock includes a pin that is received within an aperture to block movement of the plug to and from the engaged position and is withdrawn from the aperture to permit movement of the plug to and from the engaged position, the pin rotating about an axis to receive and withdraw the pin from the aperture.

20. The method of claim 14, further comprising contacting a portion of the service disconnect with a tapered end face of a pin during initial assembly, and rotating the pin after initial assembly to change an orientation of the end face.

* * * * *